United States Patent [19]
Hurtig

[11] Patent Number: 5,195,219
[45] Date of Patent: Mar. 23, 1993

[54] CORD CLAMP FOR A LAMPHOLDER

[75] Inventor: Göran Hurtig, Gislaved, Sweden

[73] Assignee: Artilux AB, Anderstorp, Sweden

[21] Appl. No.: 679,648

[22] Filed: Apr. 2, 1991

[30] Foreign Application Priority Data

Apr. 3, 1990 [SE] Sweden ............................ 9001229

[51] Int. Cl.5 ........................................... H01R 13/58
[52] U.S. Cl. .................... 24/136 R; 439/472
[58] Field of Search ............... 439/449, 450, 460, 470, 439/472; 24/16 R, 136 R, 115 M; 174/65 R, 135

[56] References Cited

U.S. PATENT DOCUMENTS

| | | | |
|---|---|---|---|
| 795,867 | 8/1905 | Stakelbeck | 439/460 |
| 1,611,651 | 12/1926 | Leavitt | 439/472 X |
| 2,484,525 | 10/1949 | Norris | 439/460 X |
| 4,209,661 | 6/1980 | Pate et al. | 439/460 X |

FOREIGN PATENT DOCUMENTS

3813233 12/1988 Fed. Rep. of Germany ...... 439/460
2180106 3/1987 United Kingdom ................ 439/460

*Primary Examiner*—James R. Brittain

[57] ABSTRACT

A cord clamp for a lampholder includes at least two tongue elements which are mutually, reciprocally and relatively movable, and between which a cord can be gripped with the aid of a clamping keeper member. The tongue elements are laterally movable in relation to each other, with their base arranged at an opening in the end portion of the lampholder. The base portion is in sliding engagement against the end portion, and the other free ends or top portions of the tongue elements are adapted to extend through an opening in a disc-shaped top portion of the clamping keeper member. The clamping keeper member further includes hooked snapping tongues projecting from the disc-shaped element which cooperates with complementarily formed locking grooves on the lampholder. The keeper member, in its position fully thrust over the tongue elements and the end portion of the lampholder, achieves a permanent snap fastening of itself as well as secure positional fixation of the cord in the lampholder.

4 Claims, 2 Drawing Sheets

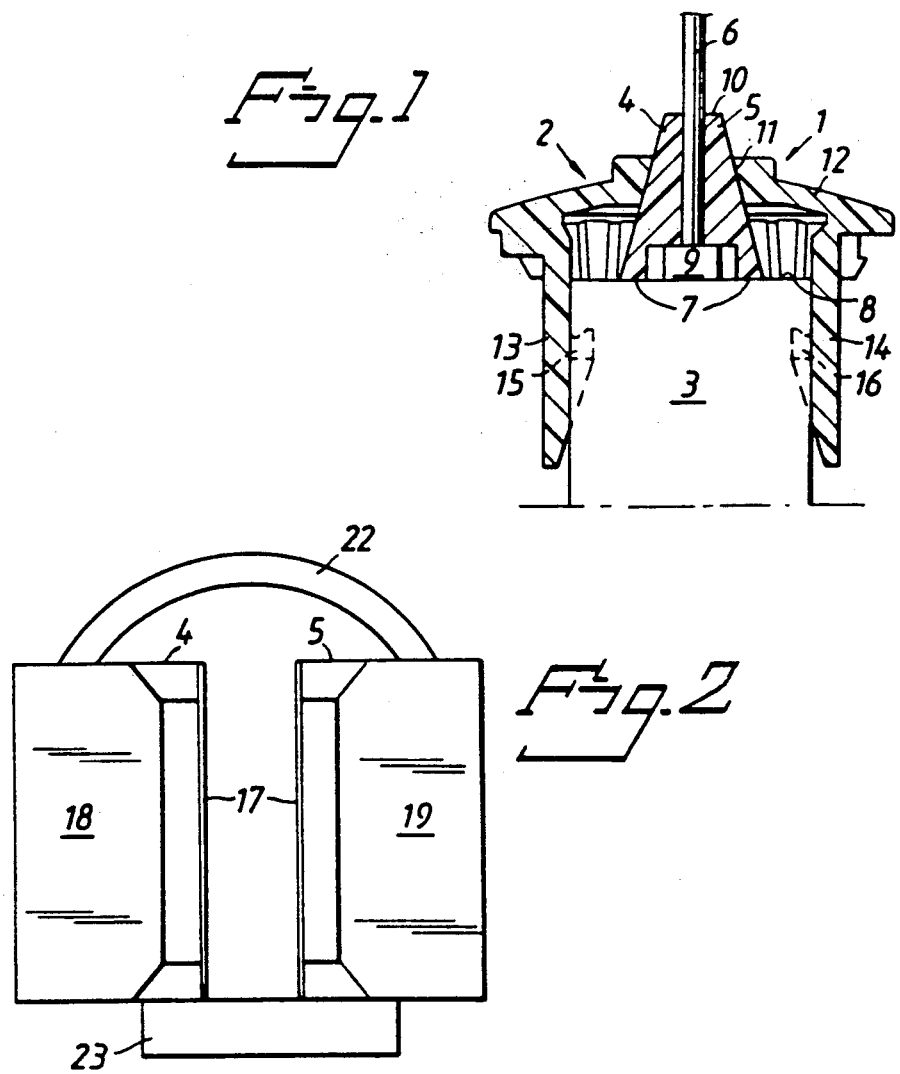

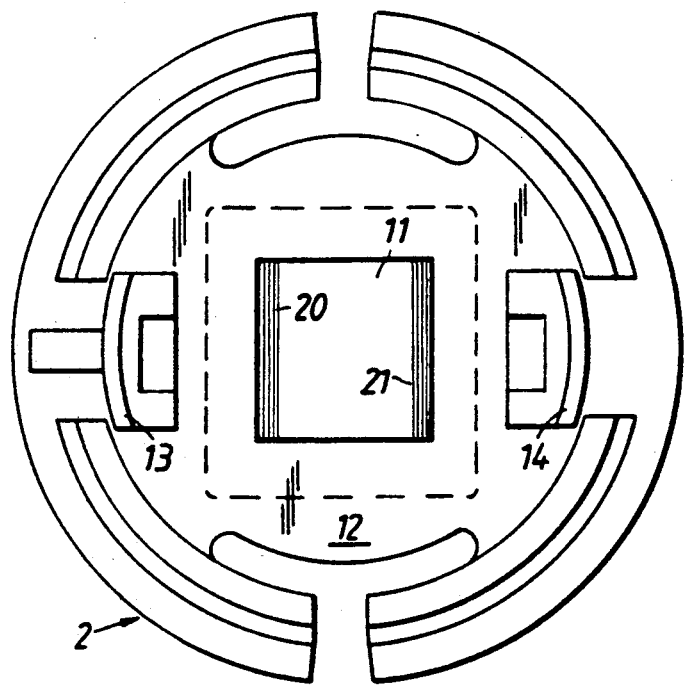
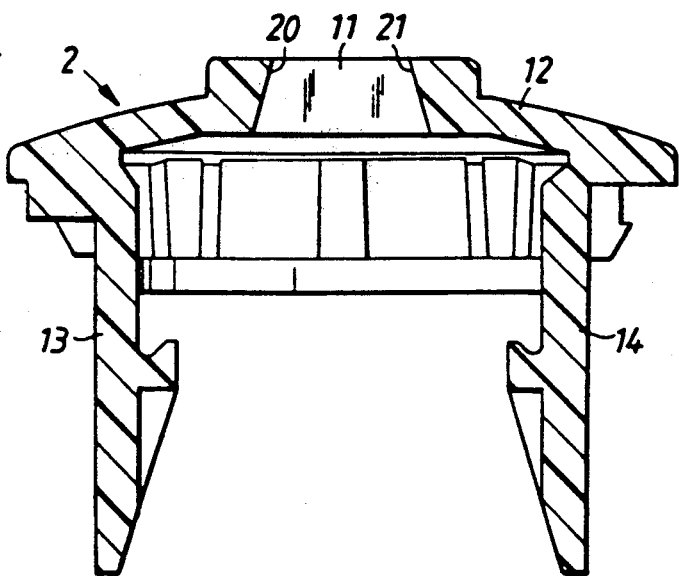
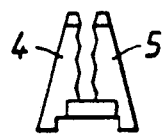

CORD CLAMP FOR A LAMPHOLDER

BACKGROUND OF THE INVENTION

1. Field of the Invention

The present invention relates to a cord clamp in a lampholder and includes at least two mutually spaced elongated tongue elements arranged to be movable relative to each other. The cord of the lampholder is positionally fixable between the tongue elements with the aid of a clamping keeper means which can be pushed over them, thus urging them together to securely grip the cord.

2. Description of the Related Art

Previously known cord clamps of similar type have screws for clamping spring tongues against a cord, or caps which can be snapped onto the tongues for squeezing them together. These cord clamps have fixed tongues projecting from the lampholder which deflect a great deal in the region of their free end portions and very little in the region where they are fixed to the lampholder. There is thus no uniform engagement of the inside of the tongues against the cord, and consequently, the cord is unsatisfactorily fixed in position.

SUMMARY OF THE INVENTION

The object of the present invention is to provide a cord clamp in which the above-mentioned disadvantages have been eliminated.

The present invention provides a cord clamp which effectively secures a cord, while being at the same time is very simple and inexpensive to manufacture. No screws are necessary, and the positional fixation of the cord by the clamp is easily achieved by permanently snapping the special clamping keeper member to the lampholder. In addition, the invention provides a uniform, parallel engagement of the insides of the tongue elements against the cord, since they comprise separate elements movable relative to each other, thus providing a secure fixation of the cord.

BRIEF DESCRIPTION OF THE DRAWINGS

The invention will now be described, with reference to the accompanying drawings, in which:

FIG. 1 is a schematic cross section of the cord clamp,

FIG. 2 is a top view of the tongue elements illustrated in FIG. 1,

FIG. 3 is a cross section of the tongue elements when they coact with the opening of the clamping keeper means, FIG. 4 is a bottom view of the keeper means, FIG. 5 is a side view of the keeper in FIG. 4, FIG. 6 is a full scale side view of the tongue elements and FIG. 7 is a full scale bottom view of the tongue elements in FIG. 6.

DETAILED DESCRIPTION OF A PREFERRED EMBODIMENT

Referring to FIG. 1, there is illustrated a cross section of a preferred embodiment of cord clamp 1 in accordance with the present invention. The cord clamp 1 is permanently snapped together with the aid of clamping keeper means 2 on a lampholder 3. The cord clamp further includes at least two elongated tongue elements 4 and 5, which are mutually movable towards and away from each other. A cord 6 is disposed along and between them and is positionally fixed to the lampholder 3 by the squeezing of the tongue elements 4 and 5 together with the aid of the clamping keeper means 2.

At their base 7, the tongue elements 4,5 are slidably arranged against the end portion 8 of the lampholder 3 with an opening 9 provided therebetween for the cord. The other end or top portions 10 of the tongue elements 4,5 are arranged to extend through an opening 11 in the keeper means 2, where they are urged together. The opening 11 is centrally located in a disc-shaped top member 12. At least two hooked snap tongues 13 and 14 project from the disc-shaped top member 12 and coact with complementarily formed locking grooves 15 and 16 on the lampholder 3. The keeper means 2 is snappably and permanently fixable to the lampholder 3 by being pushed into a final position, where the tongue elements 4,5 are urged with a sufficient force against the cord 6, thus achieving a secure fixation of the cord.

As shown in more detail in FIGS. 2 and 3, the tongue elements 4,5 may be provided with serrations 17 for providing a better grip on the cord 6. The elements 4,5 are mutually connected by connecting tabs 22 and 23 at their base portions for maintaining them a predetermined distance apart, substantially corresponding to the thickness of the cord 6. In addition, the radially outward surfaces 18 and 19 of the elements 4,5 may be disposed at about 15° from the longitudinal axis of the elements converging from the lower portion to the upper portion. Outward surfaces 18,19 are arranged to coact with complementary slanting surfaces on opposing edge portions 20 and 21 in the opening 11 of the keeper means 2.

In FIG. 4, the appearance of the opening 11 is depicted in more detail in a bottom view, and in FIG. 5 there is shown a cross-sectional side view of the keeper means 2. Finally, in FIGS. 6 and 7, the tongue elements 4,5 are depicted in their actual size.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

I claim:

1. A cord clamp for securing a cord of a lampholder, said clamp comprising:
   (a) first and second tongue elements movable towards and away from each other, said tongue elements having inner surfaces and tapered outer surfaces; and
   (b) a clamping keeper means comprising:
      (i) a disc-shaped top member having a centrally disposed opening which, when forced over the tapered outer surfaces of said first and second tongue elements, urges said tongue elements towards each other, such that the inner surfaces of said tongue elements securely grip the cord of said lampholder when said cord is disposed therebetween; and
      (ii) at least two hooked snap tongues extending from said disc-shaped top member, said snap tongues being adapted to engage corresponding locking grooves on the lampholder to securely fasten said clamping keeper means over said first and second tongue elements.

2. A cord clamp according to claim 1, wherein said opening is defined by opposing edge portions tapered to cooperate with said tapered outer surfaces of said first and second tongue elements.

3. A cord clamp according to claim 2, wherein said first and second tongue elements are connected a predetermined distance apart from each other at a base end disposed adjacent to said lampholder, said predetermined distance corresponding approximately to the thickness of said cord.

4. A cord clamp according to claim 3, wherein said first and second tongue elements have a rectangular cross section.

* * * * *